United States Patent [19]

Tatemoto et al.

[11] Patent Number: 5,053,469

[45] Date of Patent: Oct. 1, 1991

[54] FLUORINE-CONTAINING COPOLYMER

[75] Inventors: Masayoshi Tatemoto; Takayuki Nakamura, both of Osaka, Japan

[73] Assignee: Daikin Industries Ltd., Osaka, Japan

[21] Appl. No.: 520,880

[22] Filed: May 9, 1990

[30] Foreign Application Priority Data

May 17, 1989 [JP] Japan .................................. 1-124058

[51] Int. Cl.$^5$ .............................................. C08F 14/18
[52] U.S. Cl. .................................... 526/242; 526/249; 526/250; 526/255
[58] Field of Search ................ 526/249, 242, 250, 255

[56] References Cited

U.S. PATENT DOCUMENTS

| | | | |
|---|---|---|---|
| 2,559,754 | 7/1951 | Bittles, Jr. et al. | 556/19 |
| 2,597,702 | 5/1952 | Benning | 526/249 |
| 3,678,100 | 7/1972 | Frank et al. | 526/249 |

*Primary Examiner*—Joseph L. Schofer
*Assistant Examiner*—N. Sarofim
*Attorney, Agent, or Firm*—Birch, Stewart, Kolasch & Birch

[57] ABSTRACT

A fluorine-containing copolymer comprising repeating units derived from an olefin of the formula:

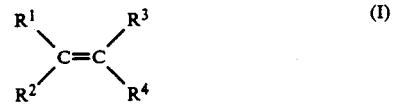

(I)

wherein $R^1$, $R^2$, $R^3$ and $R^4$ are the same or different and are each a hydrogen atom or a fluorine atom, or one is a chlorine atom and the remainder are fluorine atoms, and repeating units derived from a vinylphosphonic acid derivative of the formula:

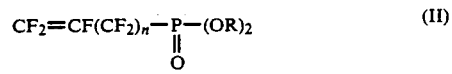

(II)

wherein R groups are the same or different and are each an alkyl group having 1 to 12 carbon atoms, an alkenyl group having 2 to 12 carbon atoms or a phenyl group, and n is 0, 1 or 2, which has good hydrophilicity.

9 Claims, No Drawings

FLUORINE-CONTAINING COPOLYMER

BACKGROUND OF THE INVENTION

1. Field of the Invention

The present invention relates to a novel fluorine-containing copolymer with hydrophilicity.

2. Description of the Related Art

Various fluorine-containing polymers are known. However, almost all these polymers have hydrophobicity but little hydrophilicity.

SUMMARY OF THE INVENTION

An object of the present invention is to provide a fluorine-containing fluorine with good hydrophilicity.

This object is achieved by a fluorine-containing copolymer comprising 40 to 99% by mole of repeating units derived from an olefin of the formula:

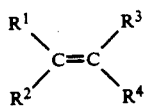
(I)

wherein $R^1$, $R^2$, $R^3$ and $R^4$ are the same or different and are each a hydrogen atom or a fluorine atom, or one is a chlorine atom and the remainder are fluorine atoms, and 1 to 60% by mole of repeating units derived from a vinylphosphonic acid derivative of the formula:

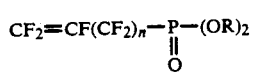
(II)

wherein the R groups are the same or different and are each an alkyl group having 1 to 12 carbon atoms, an alkenyl group having 2 to 12 carbon atoms or a phenyl group, and n is 0, 1 or 2.

The fluorine-containing copolymer of the present invention preferably has a number average molecular weight of 1500 to 1,000,000.

DETAILED DESCRIPTION OF THE INVENTION

The fluorine-containing copolymer of the present invention comprises olefin (I) and vinylphosphonic acid derivative (II) in a molar ratio of 40:60 to 99:1, preferably 60:40 to 80:20.

Specific examples of olefin (I) which constitutes the fluorine-containing copolymer of the present invention are ethylene, monofluoroethylene, vinylidene fluoride, vinyl fluoride, trifluoroethylene, chlorotrifluoroethylene, and tetrafluoroethylene.

Specific examples of vinylphosphonic acid derivative (II) are
$CF_2=CFPO(OCH_3)_2$,
$CF_2=CFCF_2PO(OCH_3)_2$,
$CF_2=CF(CF_2)_2PO(OCH_3)_2$,
$CF_2=CFPO(OC_2H_5)_2$,
$CF_2=CFCF_2PO(OC_2H_5)_2$,
$CF_2=CF(CF_2)_2PO(OC_2H_5)_2$,
$CF_2=CFPO(OC_6H_5)_2$, and
$CF_2=CFPO(OCH_2CH=CH_2)_2$.

Vinylphosphonic acid derivative (II) wherein R is a hydrogen atom is known from, for example, U.S. Pat. No. 2,559,754, the disclosure of which is hereby incorporated by reference. Derivative (II) may be prepared as follows:

(1) Preparation of $CF_2=CFPO(OR)_2$
$CF_2=CF_2 + P(OR)_3$

↓ tert.-amine (170° C., 8 hours)

$CF_2=CFPO(OR)_2$ (2) Preparation of $CF_2=CFCF_2PO(OR)_2$
$CF_2ClCFClCF_2CFCl_2$ ↓ $AlCl_3$ ($CCl_4$, 80° C.)

$CF_2ClCFClCF_2CCl_3$

↓ 60% fuming sulfuric acid $CF_2ClCFClCF_2COCl$

↓ i) 70% $H_2SO_4$,
  ii) aqueous NaOH $CF_2ClCFClCF_2COONa$

↓ Pyrolysis at 180° C. to 220° C.

$CF_2=CFCF_2Cl$

↓ $P(OR)_3$ at room temperature in glyme $CF_2=CFCF_2PO(OR)_2$ (3) Preparation of $CF_2=CFCF_2CF_2PO(OH)_2$
$I_2 + Cl_2$ ↓ in $CH_2Cl_2$

2IC $ICl + CF_2=CFCl$

↓ in $CH_2Cl_2$ at room temperature $CF_2ClCFClI$ (95%) + $CFCl_2CF_2I$ (5%)

$CF_2ClCFClI + CF_2=CF_2$

↓ AIBN at 60° C.

$CF_2ClCFClCF_2CF_2I$

↓ +P and $I_2$ at 140° C. to 150° C.

$(CF_2ClCFClCF_2CF_2)_nPI_{3-n}$ $(CF_2ClCFClCF_2CF_2)PI_2$

↓ 1) $H_2O$, 2) aqueous $H_2O_2$ $CF_2ClCFClCF_2CF_2PO(OH)_2$

↓ Zn in $H_2O$ or ROH $CF_2=CFCF_2CF_2PO(OH)_2$

The fluorine-containing copolymer of the present invention may contain 0.1 to 30% by mole of repeating units derived from at least one other copolymerizable monomer such as hexafluoropropylene and perfluorovinyl ether.

The fluorine-containing copolymer of the present invention has a number average molecular weight (by GPC) of 1500 to 1,000,000, preferably 3000 to 500,000.

The fluorine-containing copolymer of the present invention may be prepared by any of the conventional polymerization methods such as emulsion polymerization, suspension polymerization and bulk polymerization. The monomers may be charged batchwise or continuously to maintain the molar ratio of the monomers in the polymerization system. The monomers are radically polymerized in the presence of a polymerization initiator which is used to initiate the polymerization of conventional fluorine-containing olefins. Examples of the polymerization initiators are inorganic peroxides such as persulfates (e.g ammonium persulfate) and redox system initiators comprising a persulfate, a reducing agent (e.g. sodium sulfite nd acid sodium sulfite) and optionally an accelerator (e.g. ferrous sulfate, copper sulfate and silver nitrate); organic peroxides such as diisopropyl peroxydicarbonate, isobutyryl peroxide, benzoyl peroxide, acetyl peroxide and tert.-butyl hydroperoxide; and fluorine-containing peroxides such as [Cl(CF$_2$CFCl)$_2$CF$_2$COO—]$_2$, [H(CF$_2$CF$_2$)$_3$—COO—]$_2$, (ClCF$_2$CF$_2$COO—)$_2$ and [CH$_3$—C(CH$_3$)$_2$—OCH$_2$CF$_2$COO—]$_2$.

In the case of emulsion polymerization, as an emulsifier, an alkali metal or ammonium salt of a compound of the formula of the formula:

$$Y(CF_2)_mZ \qquad (III)$$

wherein Y is a hydrogen atom or a fluorine atom, Z is —COOH or —SO$_3$H, and m is a number of 5 to 12 is preferably used in an amount of 0.1 to 5% by weight, preferably 0.5 to 2% by weight based on the weight of water in the polymerization system.

In the case of suspension polymerization, water is generally used as a reaction medium. Together with water, a fluorohydrocarbon solvent such as 1,1,2-trichloro-1,2,2-trifluoroethane, 1,2-dichloro-1,1,2,2-tetrafluoroethane, perfluorocyclobutane, dichlorodifluoromethane and trichlorofluoromethane may be used.

A polymerization temperature depends on the decomposition rate of the polymerization initiator. In general, it is from 0° to 150° C.

A polymerization pressure depends on the polymerization method and polymerization temperature. In general, it is from 0 to 50 kg/cm$^2$G.

Although the molecular weight of the fluorine-containing copolymer of the present invention may be controlled through adjustment of relationship between a polymerization rate and an amount of the polymerization initiator, it is easily controlled by the addition of a chain transfer agent. Preferred examples of the chain transfer agent are hydrocarbons having 4 to 6 carbon atoms, alcohols, ethers and organic halogenated compounds (e.g. CCl$_4$, CBrCl$_3$, CF$_2$BrCFBrCF$_3$, CF$_2$I$_2$ and IR$_f$I in which R$_f$ is a perfluoroalkylene group).

In the fluorine-containing copolymer of the present invention wherein R is an alkyl, alkenyl or phenyl group (hereinafter referred to as "copolymer A"), at least 1% preferably at least 2% of R can be replaced with hydrogen atoms or alkali metal atoms such as potassium or sodium. Such copolymer will be referred to as "copolymer B".

The copolymer B may be prepared by copolymerizing olefin (I) with vinylphosphonic acid derivative (II) in which R is a hydrogen atom or by hydrolyzing copolymer A in the presence of an acid compound or a base compound. The hydrolysis of copolymer A to copolymer B can be carried out by using conventional reagents and conditions which are employed in the conventional hydrolysis. In the hydrolysis, an amount of the acid compound or the base compound is at least 0.1 mole per one mole of the phosphonate ester. The hydrolysis temperature is preferably from 20° to 80° C. As the acid compound, one having pH not larger than that of hydrochloric acid is preferably used. Preferred examples of such acid compound are hydrochloric acid, sulfuric acid, methanesulfonic acid, trifluoromethanesulfonic acid and chlorosulfonic acid. Preferred examples of the base compound are sodium hydroxide and ammonia.

The fluorine-containing copolymer of the present invention has hydrophilicity in addition to heat resistance, weather resistance and chemical resistance and is preferably used in the form of an aqueous paint or as a medical material and a heavy metal scavenger. Further, the fluorine-containing copolymer of the present invention may be gelled or converted to a higher molecular weight polymer and used as an ion-exchange membrane or a functional polymer.

PREFERRED EMBODIMENTS OF THE INVENTION

The present invention will be illustrated by following Examples.

EXAMPLE 1

Copolymerization of vinylidene fluoride and CF$_2$=CFPO(OCH$_3$)$_2$

CF$_2$=CFPO(OCH$_3$)$_2$ (10 g), 1,1,2-trichloro-1,2,2-trifluoroethane (30 ml) and isopropyl peroxycarbonate (IPP) (50 mg) were charged in an autoclave. After purging the autoclave internal atmosphere with nitrogen and evacuating the autoclave, vinylidene fluoride (32 g) was added and reacted at 50° C. for 9 hours. The resulting mixture was dissolved in acetone and the solution was poured in a large amount of 1,1,2-trichloro-1,2,2-trifluoroethane to precipitate a copolymer (7.0 g).

The content of the phosphonate ester monomer in the copolymer was 42% by mole according to $^{19}$F—NMR.

The copolymer had a number average molecular weight of 6000 (as converted to polystyrene) through GPC using tetrahydrofuran as solvent.

The copolymer was dissolved in organic solvents such as acetone and tetrahydrofuran and gave a transparent film by casting from the solution.

EXAMPLE 2

Copolymerization of ethylene and CF$_2$=CFPO(OCH$_3$)$_2$

CF$_2$=CFPO(OCH$_3$)$_2$ (5 g), 1,1,2-trichloro-1,2,2-trifluoroethane (50 ml) and IPP (50 mg) were charged in an autoclave. After purging the autoclave internal atmosphere with nitrogen and evacuating the autoclave, ethylene (2.8 g) was added and reacted at 50° C. for 24 hours. The resulting mixture was dissolved in dimethylformamide and the solution was poured in a large amount of 1,1,2-trichloro-1,2,2-trifluoroethane to precipitate a copolymer (5 g).

The content of the phosphonate ester monomer in the copolymer was 32% by mole according to $^1H$—NMR.

The copolymer had a number average molecular weight of 5200 (as converted to polystyrene) through GPC using tetrahydrofuran as solvent.

EXAMPLE 3

Copolymerization of vinylidene fluoride and $CF_2=CFCF_2PO(OC_2H_5)_2$ $CF_2=CFCF_2PO(OC_2H_5)_2$ (10 g), $CF_2ClCFClCF_2CFCl_2$ (80 g) and IPP (40 mg) were charged in an autoclave. After purging the autoclave internal atmosphere with nitrogen and evacuating the autoclave, vinylidene fluoride (32 g) was added and reacted at 50° C. for 20 hours. The resulting mixture was dissolved in acetone and the solution was poured in a large amount of $CF_2ClCFClCF_2CFCl_2$ to precipitate a copolymer (7 g).

The content of the phosphonate ester monomer in the copolymer was 8% by mole according to $^{19}F$—NMR.

The copolymer had a number average molecular weight of 19,000 (as converted to polystyrene) through GPC using tetrahydrofuran as solvent.

EXAMPLE 4

To a copolymer having a number average molecular weight of 6000 and a monomeric composition of vinylidene fluoride:$CF_2=CFPO(OCH_3)_2$ of 62:38 (2 g) which contained $6.79\times10^{-3}$ mole of the phosphonate eater groups, water (10 g) was added and then 1N aqueous solution of sodium hydroxide was dropwise added while stirring. As a pH indicator, phenolphthalein in ethanol was used. After adding 2 ml of 1N aqueous solution of sodium hydroxide, the copolymer was completely dissolved in water. The modified copolymer was recovered by evaporation to dryness.

According to $^1H$—NMR (solvent: $D_2O$), about 6% of the ester groups were hydrolyzed. The methyl ester of phosphonic acid is hydrophilic, and hydrolysis of 6% of the ester groups made the copolymer water soluble.

EXAMPLE 5

Copolymerization of vinylidene fluoride and $CF_2=CFCF_2CF_2PO(OH)_2$ $CF_2=CFCF_2CF_2PO(OH)_2$ (6.5 g) and water (100 ml) were charged in a 400 ml stainless steel autoclave having a glass container. After purging the internal atmosphere with nitrogen, vinylidene fluoride was injected to a pressure of 17.5 kg/cm$^2$G. After raising the mixture temperature to 60° C., an aqueous solution of ammonium persulfate containing 300 mg of ammonium persulfate was added. After 19 hours, the polymerization reaction was terminated and the reaction mixture was washed with water, hydrochloric acid and methanol successively, followed by evaporation to dryness to obtain a copolymer. The copolymer was a colorless transparent material and could be dissolved in dimethylformamide but not in acetone. According to $^{19}F$—NMR, the copolymer contained 6% by mole of phosphonic acid monomer units.

EXAMPLE 6

A copolymer of vinylidene fluoride and $CF_2=CFPO(OCH_{(OCH_3)})_2$ having a number average olecular weight of 6000 and containing 30% by mole of the phosphonate ester units was alkaline hydrolyzed. To the resulting aqueous solution of the copolymer, a 5% aqueous solution of $ZnCl_2$ was dropwise added while stirring to precipitate a white copolymer. When a salt of Na$^+$ or K$^+$ was added, no white polymer was precipitated.

To the aqueous system containing the white copolymer, 10% by weight hydrochloric acid was dropwise added. Around pH of 4, the copolymer became water soluble. Further addition of the hydrochloric acid precipitated the copolymer again.

EXAMPLE 7

A copolymer of ethylene and $CF_2=CFPO(OCH_3)_2$ having a number average molecular weight of 5200 and containing 32% by mole of the repeating units derived from $CF_2=CFPO(OCH_3)_2$ (1 g) was added in 1N aqueous solution of sodium hydroxide (20 ml) and hydrolyzed at room temperature for 120 minutes.

The hydrolyzed copolymer had a composition distribution, and a part of the copolymer was not dissolved in water. When 10% by weight hydrochloric acid was added to a supernatant solution, the system became white turbid and then the copolymer precipitated.

What is claimed is:

1. A fluorine-containing copolymer comprising 40 to 99% by mole of repeating units derived from an olefin of the formula:

$$R^1 \atop R^2 \!\!\!\diagdown\!\!\! C\!=\!C \!\!\!\diagup\!\!\! R^3 \atop R^4 \qquad (I)$$

wherein $R^1$, $R^2$, $R^3$ and $R^4$ are the same or different and are each a hydrogen atom or a fluorine atom, or one is a chlorine atom and the remainder are fluorine atoms, and 1 to 60% by mole of repeating units derived from a vinylphosphonic acid derivative of the formula:

$$CF_2=CF(CF_2)_n-\underset{\underset{O}{\|}}{P}-(OR)_2 \qquad (II)$$

wherein the R groups are the same or different and are each an alkyl group having 1 to 12 carbon atoms, an alkenyl group having 2 to 12 carbon atoms or a phenyl group, and n is 0, 1 or 2.

2. The fluorine-containing copolymer according to claim 1, which has a number average molecular weight of 1500 to 1,000,000.

3. The fluorine-containing copolymer according to claim 1, wherein a molar ratio of olefin (I) to vinylphosphonic acid derivative (II) is from 60:40 to 80:20.

4. The fluorine-containing copolymer according to claim 1, wherein olefin (I) is selected from the group consisting of ethylene, monofluoroethylene, vinylidene fluoride, vinyl fluoride, trifluoroethylene, chlorortrifluoroethylene and tetrafluoroethylene.

5. The fluorine-containing copolymer according to claim 1, wherein vinylphosphonic acid derivative (II) is selected from the group consisting of $CF_2=CFPO(OCH_3)_2$, $CFf_2=CFCF_2PO(OCH_3)_2$, $CF_232$ $CF(CF_2)_2PO(OCH_3)_2$, $CF_2=CFPO(OC_2H_5)_2$, $CF_2=CFCF_2PO(OC_2H_5)_2$, $CF_2=CF(CF_2)_2PO(OC_2H_5)_2$, $CF_2=CFPO(OC_6H_5)_2$ and $CF_2=CFPO(OCH_2CH=CH_2)_2$.

6. A fluorine-containing copolymer comprising 40 to 99% by mole of repeating units derived from an olefin of the formula:

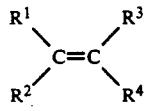

wherein $R^1$, $R^2$, $R^3$ and $R^4$ are the same or different and are each a hydrogen atom or a fluorine atom, or one is a chlorine atom and the remainder are fluorine atoms, and 1 to 60% by mole of repeating units derived from a vinylphosphonic acid derivative of the formula:

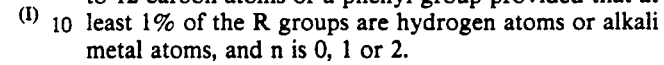

wherein the R groups are the same or different are each a hydrogen atom, an alkali metal atom, and alkyl group having 1 to 12 carbon atoms, an alkenyl group having 2 to 12 carbon atoms or a phenyl group provided that at least 1% of the R groups are hydrogen atoms or alkali metal atoms, and n is 0, 1 or 2.

7. The fluorine-containing copolymer according to claim 6, wherein at least 2% of the R groups are hydrogen atoms or alkali metal atoms.

8. The fluorine-containing copolymer according to claim 1, which further comprises 0.1 to 30% by mole of repeating units derived from hexafluoropropylene or perfluorovinyl ether.

9. The fluorine-containing copolymer according to claim 6, which further comprises 0.1 to 30% by mole of repeating units derived from hexafluoropropylene or perfluorovinyl ether.

* * * * *